UNITED STATES PATENT OFFICE.

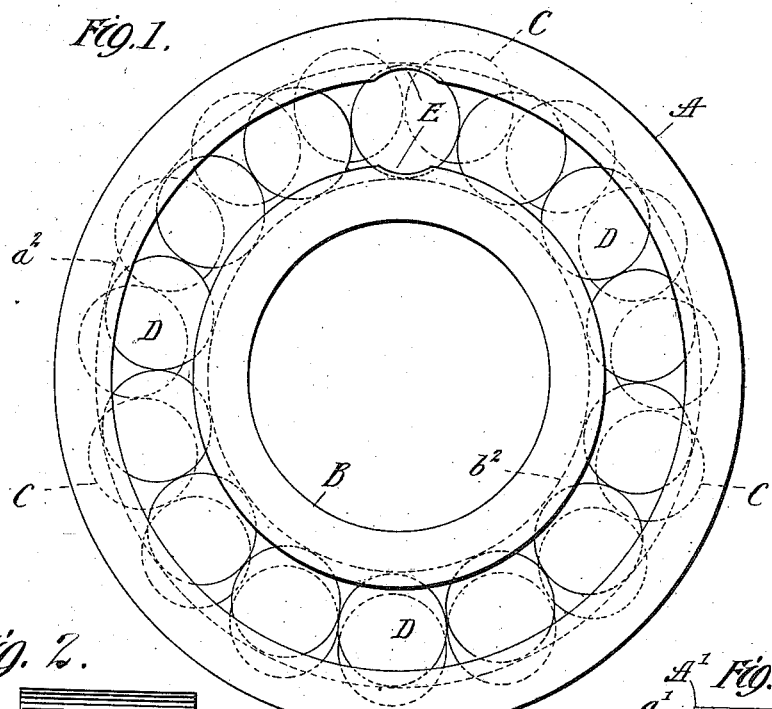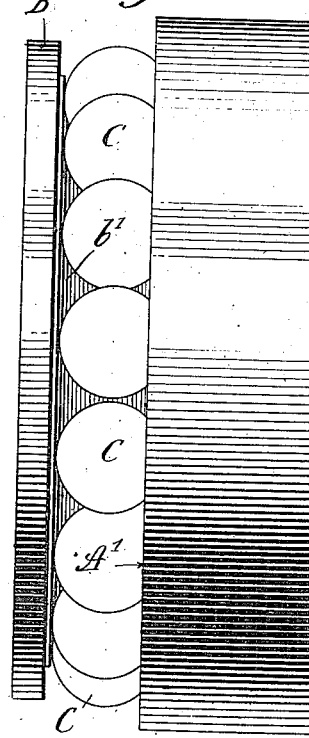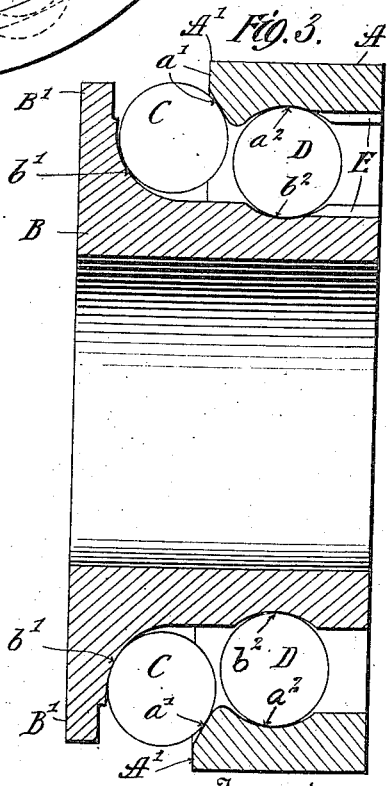

HENRY HESS, OF WAWA, PENNSYLVANIA, ASSIGNOR TO THE HESS-BRIGHT MANUFACTURING COMPANY, OF PHILADELPHIA, PENNSYLVANIA, A CORPORATION OF DELAWARE.

BALL-BEARING.

1,059,538.   Specification of Letters Patent.   Patented Apr. 22, 1913.

Application filed September 29, 1909. Serial No. 520,101.

*To all whom it may concern:*

Be it known that I, HENRY HESS, a citizen of the United States, residing at Wawa, in the county of Delaware and State of Pennsylvania, have invented certain new and useful Improvements in Ball-Bearings, of which the following is a specification, reference being had therein to the accompanying drawing.

My invention relates to ball bearings, and more particularly to that class thereof having a plurality of series of balls, and further characterized by the fact that the several parts are held together by the lateral engagement of the balls with their tracks or ways, so as to constitute a unit-handling or self-contained whole.

It is the object of my present invention to provide such a bearing adapted to support radial load, and also to sustain a considerable thrust in one direction, and to this end the two series of balls are arranged so that one series is chiefly devoted to the support of radial load, and the other series to resist the thrust. Incidentally the first named series resists in a lesser degree thrust in the opposite direction, and similarly the second named series takes radial load to a certain extent. The bearing is also constructed in such manner that one of the series of balls, preferably the second named series, by reason of its engagement with its tracks or ways, holds the parts together so as to constitute a self-contained or unit-handling bearing, as referred to above.

In the accompanying drawing I have shown my invention in preferred form, but obviously many changes and variations may be made therein without departing from its spirit; and, generally speaking, I desire it to be understood that I do not limit myself to any specific details except in so far as such limitations are specified in the claims.

Referring to the drawing: Figure 1 is a side view of a bearing embodying my invention; Fig. 2 is an edge view thereof; and Fig. 3 is a longitudinal section thereof.

In the form of my invention shown by way of illustration in the drawing, the bearing comprises an outer casing member A and an inner casing member B, between which are mounted the two series of balls C and D. One of the casing members, in the present instance the inner one B, is formed with a projecting flange B', wherein is formed the track or way $b'$. The other casing member, in the present instance the outer one A, is of less depth and does not extend laterally to the full width of the bearing. At the side edge A' of this member A is formed a track or way $a'$, which, because of the construction described and illustrated, is angularly located with reference to the track or way $b'$ in the flange B'. In the tracks or ways $a'$, $b'$, is disposed the series of balls C, and because of their angular location, it will be seen that they take thrust in one direction, to wit, that indicated by the arrow in Fig. 3. At the other side the casing members A and B are formed respectively with the grooves $a^2$, $b^2$, which constitute a raceway wherein the series of balls D is located. The tracks or ways $a^2$, $b^2$, are formed radially opposite to each other in their respective casing members, and in such manner that the balls D are particularly adapted to support radial load. However, it is to be noted that the balls C in addition to resisting thrust in one direction, also take some radial load, and to this extent assist the other series of balls D. Similarly the balls D, because of their lateral engagement with the grooves $a^2$, $b^2$, resist to some extent thrust in the opposite direction to that taken by the balls C. The balls D perform an additional function, in that by reason of their engagement with the sides of the grooves $a^2$, $b^2$, they serve to hold the several parts together, thus constituting a bearing of the self-contained or unit-handling variety.

The bearing is preferably assembled by first locating the balls C in the track or way $b'$ of the casing member 2, then passing the casing member A to its place, and finally introducing the balls D into the tracks or ways $a^2$, $b^2$. The last-mentioned step may be performed in any desired manner, although for purposes of illustration I have shown a filling opening E, through which the balls may be passed in the manner well-known in the art.

As previously stated, I do not confine myself to the exact form herein shown and described, as many variations and alterations will suggest themselves to those skilled in the art without departing from the spirit of my invention.

Having thus described my invention, its construction and mode of operation, what

I claim and desire to secure by Letters Patent of the United States is as follows:

1. In a two-row ball bearing, the combination of two integral casing members with two series of balls located therebetween, the casing members being formed at one side with angularly disposed tracks or ways constituting an inclined raceway in which one series of balls is located so as principally to take thrust in one direction and radial load to a lesser degree, and the casing members being formed at the other side with radially opposed grooves constituting a raceway wherein the second series of balls is located so as to take radial load principally and thrust in a lesser degree in a direction opposite to that taken by the first series of balls, the parts being held together as a unitary whole by the engagement of the second series of balls within the said radially opposed grooves.

2. In a two-row ball bearing, the combination of two integral casing members with two series of balls located therebetween, the casing members being formed of unequal extent and provided with angularly disposed tracks or ways constituting an inclined raceway in which one series of balls is located so as principally to take thrust in one direction and radial load to a lesser degree, and the casing members being formed also with radially opposed grooves constituting a raceway wherein the second series of balls is located so as to take radial load principally and thrust in a lesser degree in a direction opposite to that taken by the first series of balls, the parts being held together as a unitary whole by the engagement of the second series of balls within the said radially opposed grooves.

In testimony whereof I have affixed my signature in presence of two witnesses.

HENRY HESS.

Witnesses:
 THEO. H. McCALLA,
 JOHN S. CLEMENT.

Copies of this patent may be obtained for five cents each, by addressing the "Commissioner of Patents, Washington, D. C."